United States Patent Office 3,110,443
Patented Nov. 12, 1963

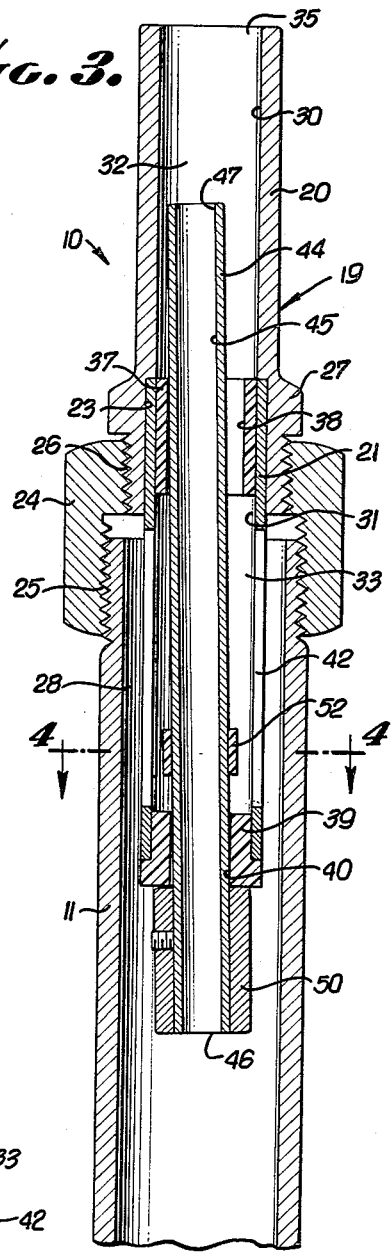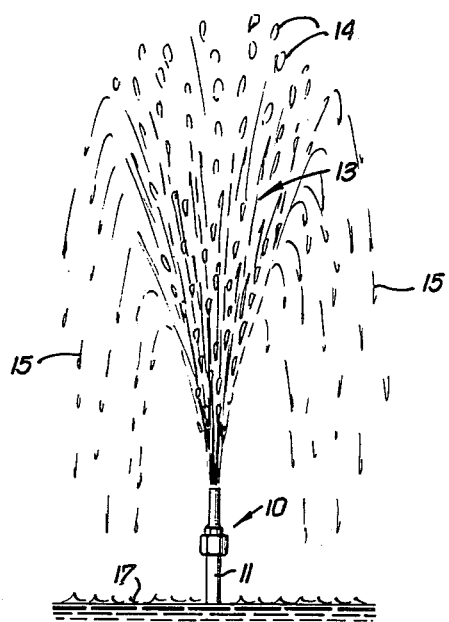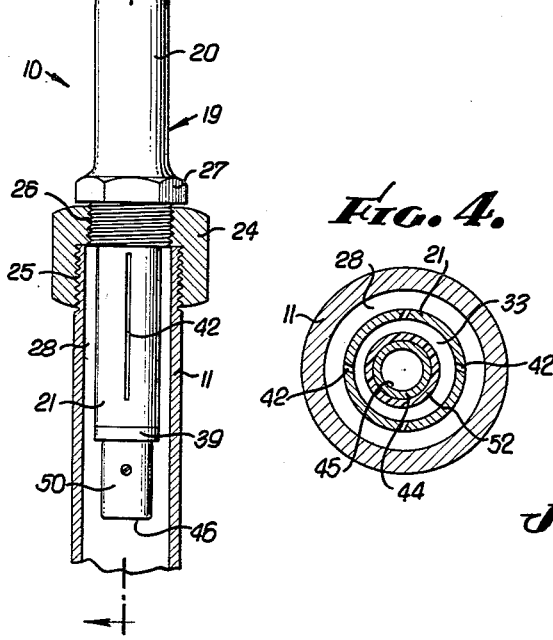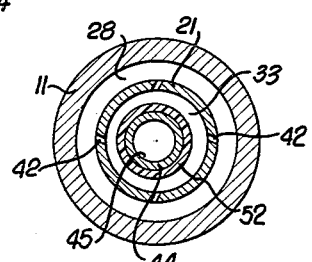

3,110,443
ORNAMENTAL FOUNTAINS OF AERATED GLOBULES
John O. Hruby, Jr., Burbank, Calif., assignor, by mesne assignments, to Rain Jet Corp., Burbank, Calif., a corporation of California
Filed Aug. 21, 1962, Ser. No. 218,311
5 Claims. (Cl. 239—210)

This invention relates to improvements in devices for producing ornamental water fountains.

The fountains of this invention are characterized as comprising a narrow inverted cone of relatively large and discrete aerated globules of water. The globules, with entrained air, are whitish or translucent rather than being clear, whereby the fountains have an appearance of subsistence. Some of the globules appear to burst as they shoot up in the fountain while the greater number of them appear to burst at or near the top of the fountain and produce dropping traces of water around the cone of upwardly shooting globules. The bursting appearance of the globules along with their massiveness as they shoot up provide an ornamental water fountain of lively and spirited affects.

The fountain devices of this invention have structural and functional features which are similar in certain aspects thereof to the fountain devices of U.S. Patent No. 3,030,028. As is the case for the instant invention, the fountain devices of said patent are characterized by a tubular stem which is caused to gyrate around in a tubular body with the axis of the stem being inclined with respect to the axis of the body and with the stem tracing a geometric surface known as hyperboloid of one sheet. Such gyration of the tubular stem is effected by rotation of water in the body, the rotating water being hereinafter referred to as driving water to distinguish the same from that which passes upwardly through the stem.

The devices of the instant invention utilize the driving water to break up the solid stream of water from the stem. More particularly, the upper end of the stem is disposed within a tubular extension of the body such that as the stream of water from the stem is broken up by the rotating upwardly moving driving water, air within the extension becomes entrained in the water being jetted up from the device with the result of producing relatively large and discrete aerated globules.

In the following part of this specification, the details of construction and mode of operation of a preferred embodiment of the invention are described with reference to the accompanying drawing, in which:

FIG. 1 is a view in elevation of a fountain device of this invention and of a water fountain produced by the device;

FIG. 2 is a side elevation of the fountain device, on a larger scale, and positioned in a water supply pipe which is shown in vertical section;

FIG. 3 is a central vertical section on a still larger scale through the device; and, FIG. 4 is a cross-section through the device taken upon a plane indicated by line 4—4 on FIGURE 3.

Referring to the drawing in greater detail, a preferred form of the fountain devices of this invention is illustrated, the same being designated generally by reference numeral 10. It receives water from a riser pipe 11 upon which it is mounted. The device 10 produces a fountain of water having a narrow inverted cone 13 of rising aerated globules 14 of water, and dropping traces of water drops 15 around the cone 13. The water from the fountain falls upon the surface of water 17 contained in a basin or other receptacle, not shown.

Fountain device 10 comprises a hollow body 19 which in the case of the illustrated embodiment is formed of two axially aligned tubular sections, the upper section being designated by reference numeral 20 and the lower section by numeral 21. The sections are interconnected as by force-fitting the upper end of the lower section 21 telescopically in an inside annular rabbet 23 in the lower end of the upper section. The body 10 is adapted to be secured atop the riser pipe 11 with a nut 24 providing a screw-thread connection at 25 with the pipe and at 26 with the lower end of the upper section 20. A hexagonal collar 27 at the outside of the body permits easy turning of the body into the nut for screw-threaded securement. The upper section 20 extends above the riser pipe and the lower section 21 extends into the pipe, the lower section 21 being of smaller outside diameter than the inside of the pipe to provide an annular space 28 around the lower section.

Numerals 30 and 31 designate the inside cylindrical surfaces, respectively, of the upper and lower sections 20 and 21, the diameters thereof, for the illustrated embodiment, being of the same size. The inside bore or chamber of the upper section 20, as defined by the cylindrical surface 30 is designated by reference numeral 32 and that of the lower section by reference 33. The upper edge of the upper section defines a fluid discharge opening 35 of the body from which the fountain 13—15 rises. There is an annular bearing 37 on the inside of the body positioned intermediate the upper and lower ends of the body, such bearing, in the illustrated embodiment, being force-fitted in the upper end portion of the tube constituting the lower section 21. Annular bearing 37 defines a restricted passage 38 extending axially therethrough. Another annular bearing 39 is force-fitted in the lower end of the lower section 21, and it has an opening 40 which is axially aligned but smaller in diameter than the restricted passage 38 of the upper bearing 37. The bearings 37 and 39 are shown as being formed of laminated phenolic composition.

Formed in the tubular lower section 21 is a plurality of openings 42 for admitting water into the cavity 33 of the lower section 21. In the illustrated embodiment, these are formed as narrow slits which extend longitudinally of the body 19. There are four such slits for the device 10, they being uniformly spaced apart in a circumferentially arranged series around the body. As best appears in FIGURE 4 the slits 42 extend through the wall of the lower section 21 at an angle with respect to the radii of cavity 33, thereby to cause water in the body cavity to spiral around and upwardly through the restricted passage 38, thence through the upper section 20, and out through the discharge opening 35.

Arranged longitudinally in the body 19 is an open-ended tubular stem 44 extending through upper and lower bearings 37 and 39. Numeral 45 designates the axially extending passage or bore of the stem which is open at its lower end as inlet opening 46 for reception of water from the riser 11 and at its upper end 47 for discharge of water into the upper chamber 32. The stem is substantially smaller in outside diameter than the restricted passage 38. The opening 40 of the lower annular bushing 39 is only slightly larger in diameter than the stem, enough so that it will accommodate sufficient inclination of the stem with respect to the axis of the body 19 to permit engagement of the stem with the inside surface of the upper bearing 37 which defines its restricted passage 38.

Stop means are provided for maintaining the stem positioned in the body with the upper end of the stem being spaced below the discharge opening 35 and above the upper bearing 37. Such stop means in the illustrated embodiment comprises a collar 50 on the lower end of the stem which through engagement with the lower bearing 39 prevents the stem from being driven upwardly out from the body, and an upper collar 52 which through engagement with the lower bearing 39 prevents the stem from dropping down from within the body.

As thus far described, and except for the extension of the upper section 20 above the upper end of the stem 44 and the fact that the stem 44 has no enlarged head and its outlet end opening is of the same size as its bore 45, the illustrated fountain device 10 is similar to that illustrated and described in U.S. Patent No. 3,030,028. A review of the explanation of the mode of operation of the fountains of said patent will make it clear that for the fountain device of the instant invention, the swirl of water around and upwardly in the cavity 33, because of the slant of water inlet openings 42, will cause the stem to gyrate around in the body with the axis of the stem being inclined with respect to the axis of the body. In being so gyrated, the stem traces a hyperboloid of one sheet, the construction of such geometric surface being at the pivot part of the stem, i.e. that part disposed within the lower bearing 39, the upper and lower ends of the stem tracing circles of larger diameter than the pivotal part of the stem. Though of no consequence in the instant invention, the stem 44 also rotates on its longitudinal axis due to rolling of the stem along the inside surfaces of the upper and lower bearings.

The driving water, admitted through the slant slits 42, flows upwardly through the restricted passage 38 around the stem and out through the fluid discharge opening 35. Such driving water is restrained from diverging radially outward in the upper section 20 because the upper cylindrical cavity 32 is of the same cross-sectional area as the lower cylindrical cavity 33. It is to be noted further that the sum total of the slit opening 42 is greater than the size of the restricted passage 38 less the cross-sectional size of the stem 44, whereby the lower cavity is maintained full of water and the flow rate of water per unit volume in upper chamber 32 is substantially equal to that in lower chamber 33. The driving water impinges obliquely against the stream of water from the upper end of the stem whereby such driving water breaks up the stem water. The upper chamber 32 and its discharge opening being large enough, with respect to the rate of water flowing through them, to admit a constant supply of air, the interjection of driving water against the stem water causes not only break-up of water in upper chamber 32 but also entrainment of air. Gyration of the stem, as described above, results in the main part of the stream from discharge opening 35 to follow a narrow inverted cone. The combined effects of these actions produces a water fountain of the large aerated globules 14.

While the instant invention has been shown and described in what is conceived to be the most practical and preferred embodiment, it is recognized that departures may be made therefrom within the scope of the invention, which is, therefore, to be accorded the full scope of the claims.

Having described the invention, what is claimed as new in support of Letters Patent is:

1. A device for producing a water fountain comprising a tubular body having an upper section and a lower section with the upper end of the upper section being a fluid discharge opening from which the fountain rises, means for securing the body to a water supply pipe with said lower section extending into the pipe, and an annular bearing on the inside of the body spaced from the body ends and having a restricted passage extending centrally therethrough, the lower section having an inlet opening between said bearing and the lower end of the body for admitting water from said pipe, an open-ended tubular stem extending longitudinally in the body and through said passage, stop means operatively associated with the stem and the body for maintaining the stem positioned in the body with the upper end of the stem being spaced below said discharge opening and above said bearing, the stem being gyratable around in the body with the axis of the stem being inclined with respect to the vertical axis of the body and the stem tracing a hyperboloid of one sheet whereby air within the upper section becomes entrained in water discharged from said stem to produce relatively large aerated globules of water in the fountain.

2. A device for producing a water fountain comprising a tubular body having an upper section and a lower section with the upper end of the upper section being a fluid discharge opening from which the fountain rises, means for securing the body to a water supply pipe with said lower section extending into the pipe, and an annular bearing on the inside of the lower section having an opening concentric with the inside of the lower section, the lower section having an inlet opening above said bearing for admitting water from said pipe, an open-ended tubular stem extending longitudinally in the body and through said bearing opening, the outside diameter of the upper end portion of the stem being appreciably smaller than the inside of the upper section and the discharge opening, stop means operatively associated with the stem and the body for maintaining the stem against being driven upwardly through said discharge opening and against dropping through said bearing opening, the upper end of the stem being spaced below said discharge opening and above said inlet opening, said inlet opening being inclined with respect to radii of the lower section for imparting rotary motion to water in the body thereby to gyrate the stem around in the body with the upper end of the stem describing a closed path around within the inside of the body and larger than said bearing opening with the result that air within the upper section becomes entrained in water discharged from the stem to produce relatively large aerated globules of water generally axially in the fountain.

3. A device for producing a water fountain comprising a tubular body having an upper section and a lower section with the upper end of the upper section being a fluid discharge opening from which the fountain rises, means for securing the body atop a water supply pipe with the lower section extending into the pipe and spaced from the inside surface of the pipe, an upper annular bearing on the inside of the body spaced from the body ends and having a restricted passage extending centrally therethrough, and a lower annular bearing on the inside of the lower section spaced below the upper bearing and having an opening axially aligned with and smaller in diameter than said restricted passage, the lower section having an inlet opening between said bearings for admitting water from said pipe, an open-ended tubular stem extending longitudinally in the body through upper and lower bearings, the outside diameter of the stem being appreciably smaller than each of said restricted passage and said discharge opening, stop means on the stem engageable with the body for maintaining the stem against being driven upwardly through said discharge opening and against dropping through the lower bearing, the upper end of the stem being smaller than said restricted passage and being spaced below said discharge opening and above the upper bearing, said inlet opening being inclined with respect to radii of the lower section for imparting rotary motion to water in the body thereby to gyrate the stem around in the body with the upper end of the stem describing a circle concentric with the inside of the body and larger than the opening of the lower bearing with the result that air within the upper section becomes entrained in water discharged from said stem to produce on account of said gyration of the stem relatively large aerated globules of water generally axially in the fountain.

4. A device according to claim 3 in which the cross-sectional sizes of the inside of the upper section and that of the discharge opening are substantially equal to that of the inside of the lower section.

5. A device according to claim 3 in which said inlet opening is one of a circumferentially arranged series of longitudinally extending inlet slits, and the sum total of the slit openings being greater than the size of the restricted passage less the cross-section of the stem.

References Cited in the file of this patent

UNITED STATES PATENTS

| | | |
|---|---|---|
| 2,248,386 | Richardson | July 8, 1941 |
| 2,639,191 | Hruby | May 19, 1953 |
| 2,954,171 | Hruby | Sept. 27, 1960 |
| 3,000,575 | Hruby | Sept. 19, 1961 |
| 3,030,028 | Hruby | Apr. 17, 1962 |